Dec. 5, 1961   E. M. McELHINNEY ET AL   3,011,793
MATERIAL SPREADING AND LOADING APPARATUS
WITH FLAIL BEATER AND COVER
Filed Feb. 19, 1959   5 Sheets-Sheet 1

INVENTORS
JOSEPH B. KUCERA
BY ERIC M. McELHINNEY
Lowell & Henderson
ATTORNEYS

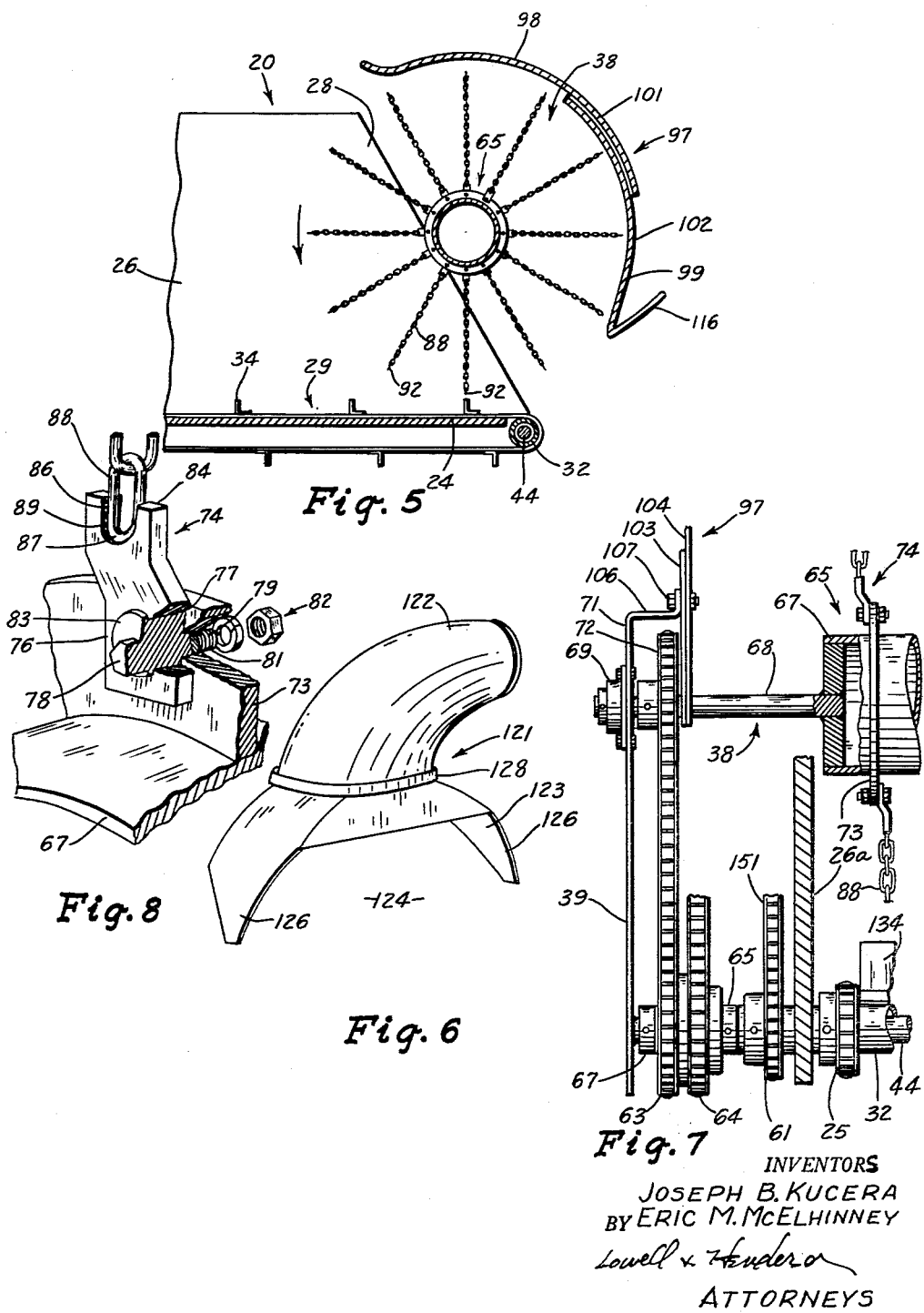

Dec. 5, 1961    E. M. McELHINNEY ET AL    3,011,793
MATERIAL SPREADING AND LOADING APPARATUS
WITH FLAIL BEATER AND COVER
Filed Feb. 19, 1959    5 Sheets-Sheet 3

INVENTORS
JOSEPH B. KUCERA
BY ERIC M. MCELHINNEY
Lowell + Henderson
ATTORNEYS

INVENTORS
JOSEPH B. KUCERA
BY ERIC M. McELHINNEY
Lowell & Henderson
ATTORNEYS

Dec. 5, 1961  E. M. McELHINNEY ET AL  3,011,793
MATERIAL SPREADING AND LOADING APPARATUS
WITH FLAIL BEATER AND COVER
Filed Feb. 19, 1959  5 Sheets-Sheet 5

INVENTORS
JOSEPH B. KUCERA
BY ERIC M. McELHINNEY
Lowell & Henderson
ATTORNEYS

United States Patent Office 3,011,793
Patented Dec. 5, 1961

3,011,793
MATERIAL SPREADING AND LOADING APPARATUS WITH FLAIL BEATER AND COVER
Eric M. McElhinney, Dysart, and Joseph B. Kucera, Traer, Iowa, assignors of one-third to Rudolph L. Lowell, Des Moines, Iowa
Filed Feb. 19, 1959, Ser. No. 794,307
5 Claims. (Cl. 275—1)

This invention relates generally to material spreading apparatus and in particular to a fertilizer spreader apparatus wherein a flail or beater unit with cover means is selectively operable to provide for the apparatus functioning as a material spreader, loader or mixer.

Fertilizer spreaders now in common use comprise generally a box open at one end and having a conveyor means for moving material toward the open end of the box and into a transversely extended spreader unit. The spreader unit usually includes a pair of rotatable pick-up assemblies or pick-up fingers that act on the fertilizer moved into them by the conveyor means. These rotatable assemblies are without any comminuting action on the fertilizer and in the handling of manure often spread unevenly by throwing clods or "gopher mounds." A further objection to these spreaders is their tendency to wrap the manure about the rotatable spreader assemblies whereby to impair the effectiveness of the fingers in picking up and throwing the manure along with throwing the assemblies out of rotational balance. Additionally, the pick-up fingers are spaced an appreciable distance from the conveyor means, or the bottom of the box, so that an appreciable portion of the material is not acted upon by the fingers and is moved from the box by the conveyor means for falling directly to the ground without being spread. The overall spreading job is thus spotty and uneven. Also in the event any foreign objects such as wire, rocks, portions of wood or the like, are present in the fertilizer, the rotatable finger assemblies are subject to damage.

On completion of a spreader operation it is generally necessary for the operator, on returning to the barnyard for reloading, to disconnect the tractor from the spreader and then reload the spreader by using the tractor as a loader, it being common practice to have a loader attachment on the tractor for this purpose. The tractor is then again connected to the spreader for towing and supplying power for the spreading operation. It will be further appreciated that since the loader attachment remains on the tractor for ready use in reloading the spreader, it is always in the way when the spreader is in transport or in use. Additionally, time is required of the operator in mounting and demounting the loader attachment when the tractor is to be used with the spreader.

It is an object of this invention, therefore, to provide an improved fertilizer spreader for farm use.

A further object of this invention is to provide a spreader apparatus wherein a spreader unit is selectively operable to have the apparatus function as a spreader, a material mixer, or a loader for the spreader.

Another object of this invention is to provide a tractor-drawn spreader apparatus wherein a flail or beater assembly is selectively operable to spread material, and to reload the spreader with material on completion of a spreader operation, without requiring any disconnection of the tractor.

A still further object of this invention is to provide a spreader apparatus having a flail unit of a simple and economical construction, and efficient in operation to selectively perform fertilizing spreading and loading operations, and a feed mixing operation, while still permitting use of the apparatus for hauling and unloading bulk material such as sacked goods, rock, dirt, potatoes and the like.

Another object of this invention is to provide a spreader apparatus wherein a flail or beater assembly is adapted to act on substantially all of the material to be spread and to uniformly spread the material in a broken up or comminuted form.

A further object of this invention is to provide a material spreader apparatus in which a rotatable spreader unit is self-cleaning and of a construction to prevent any wrapping of material thereabout.

Further objects, features and advantages of this invention will become apparent from the following description when taken in connection with the accompanying drawing in which:

FIG. 5 is an enlarged sectional detail view of the rear end portion of the apparatus showing the assembly relation of the flail assembly and conveyor means of the apparatus;

FIG. 6 is an enlarged perspective view of the attachable deflector shown in FIG. 3;

FIG. 7 is an enlarged sectional detail view as seen substantially along the line 7—7 in FIG. 4;

FIG. 8 is an enlarged detail perspective, with parts broken away and other parts in section, showing the adjustable connection of a flexible beater or flail with its rotatable support;

Figure 1:
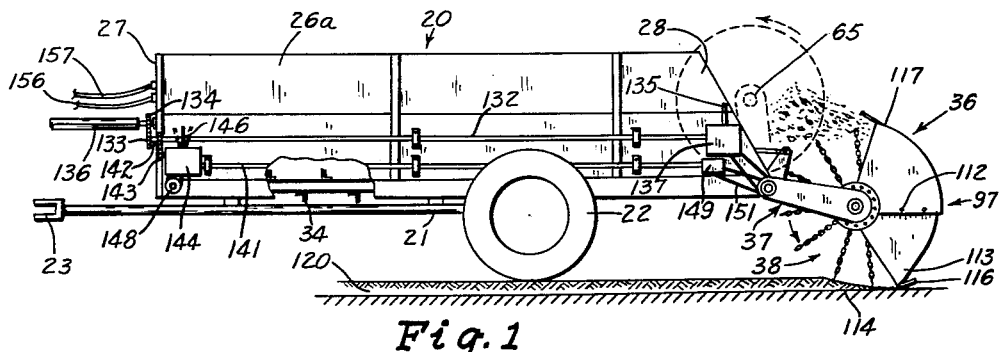
FIG. 1 is a side elevational view of the spreader apparatus of this invention showing the flail assembly thereof in a position for loading material from the ground surface into the spreader.
Figure 2:
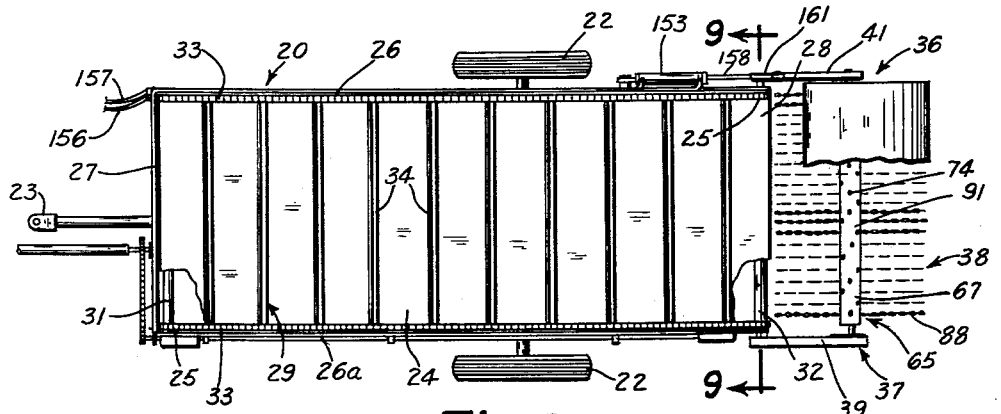
FIG. 2 is a plan view of the spreader apparatus shown in FIG. 1, with parts broken away for clarity.

With reference to the drawing, the spreader apparatus of this invention is illustrated in FIGS. 1 and 2 as including a box 20 carried on a frame 21 having ground wheels 22 and a hitch 23 for connection with a farm tractor (not shown). The box 20 is of a usual construction for spreaders for farm use and has a bottom 24, side walls 26 and 26a, a front wall 27 and an open rear end 28. Operatively associated with the bottom wall 24, for conveying material longitudinally of the box 20, is a reversible conveyor means, indicated generally as 29 (FIG. 2) and including shafts 31 and 32 extended transversely of the box and located at the front and rear ends, respectively, of the bottom wall 24. As is usual in conveyor means of this type, each shaft 31 and 32, at positions within the box and adjacent the box side walls 26 and 26a carries sprockets 25 about which are trained a pair of corresponding sprocket chains 33, extended longitudinally of the box and about the bottom wall so that their upper lengths travel on the bottom wall and adjacent to the side walls 26 and 26a. The chains 33 are connected together by transversely extended slats or rattles 34 for engaging and moving the material within the box.

The combination spreader and loader unit, indicated generally as 36 in FIGS. 1 and 2, includes a transversely extended frame structure and a flail or beater assembly, also indicated generally as 37 and 38, respectively.

Figure 9:
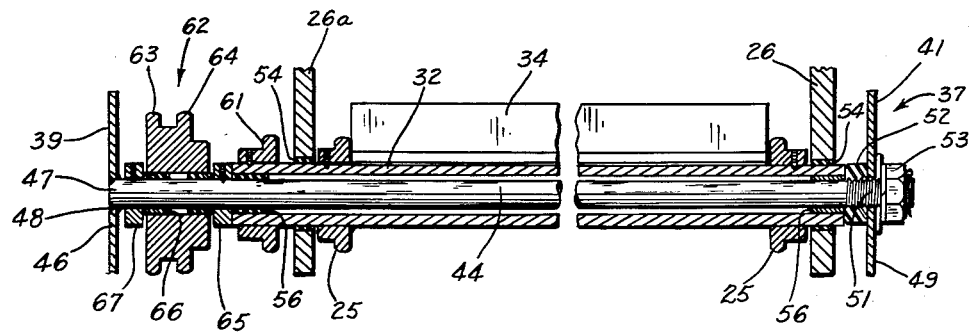
FIG. 9 is an enlarged foreshortened detail sectional view as seen along the line 9—9 in FIG. 2.

The frame structure 37 has a pair of elongated side members or arms 39 and 41 and a cross rod 44 (FIG. 9), with one end 46 of the side member 39 being secured to an end 47 of the cross rod 44 as by a weld 48, and the corresponding one end 49 of the side member 41 being secured to the other end 51 of the cross rod 44 by means including a lock nut 52 and a nut assembly 53. The rear shaft 32 for the conveyor means 29 is of a tubular construction and is rotatably supported on the box side walls 26 and 26a by suitable bearing members 54. The rod 44 is inserted within the tubular shaft 32 and is supported for rotation relative thereto by bearing members 56, with the rod being of a greater length than the shaft 32 so that its ends 47 and 51 project outwardly from opposite ends of the tubular shaft 32. It is seen, therefore, that the side members 39 and 41 of the frame structure 37 constitute rock arms relative to the cross rod 44 and are pivotally movable relative to the rear conveyor shaft 32.

The conveyor chain sprockets 25 (FIG. 9) are securely mounted on the shaft 32 at positions adjacent corresponding side walls 26 and 26a of the spreader box 20. A drive sprocket 61 for the shaft 32, is secured to the shaft 32 at a position outwardly of the box side wall 26a, so that the sprockets 25 and 61 are rotatable with the shaft 32 as a unit.

Arranged between the drive sprocket 61 and the side member 39 of the frame structure 37 is a double sprocket unit 62 having sprockets 63 and 64 utilized in operating the flail or beater assembly 38. The sprocket unit 62 is rotatably supported on the cross rod 44, as by bearings 66, and is held against axial movement relative to the rod by the stop collars 65 and 67. It will also be seen that the stop collar 65 cooperates with the nut assembly 53 and side member 41 in holding the shaft 32 against axial movement.

The sprocket unit 62 is thus rotatable relative to the rod 44 and the shaft 32, and the shaft 32 and the sprockets 25 and 61 are rotatable as a unit, relative to the sprocket unit 62 and the rod 44. Likewise it will be noted that the side members 39 and 41 and the cross rod 44, which constitute the frame support 37 for the flail assembly 38, are swingable or pivotally movable as a unit, relative to the shaft 32 and the sprocket unit 62 and about the axis of the shaft 32.

The flail assembly 38, includes a shaft 65 having a tubular body member 67 provided at each of its ends with a stub axle 68, of a reduced diameter, with only the axle 68 corresponding to the side member 39 being shown in FIG. 7. The axle 68 is rotatably supported in a bearing 69, mounted on the side plate 39 adjacent its free or terminal end 71. A sprocket 72, arranged in line with the sprocket 63 of the sprocket unit 62, is mounted on the shaft 68 at a position inwardly of the arm or side plate 39.

As shown in FIGS. 7 and 8, the body member 67 of the shaft unit 65 carries a plurality of axially spaced peripheral rings 73, of a generally rectangular shape in transverse cross-section, and projected radially from the body member 67. Each ring 73 carries a pair of diametrically opposed connecting devices, indicated generally as 74, and including a connector member 76 formed with a bore or bearing 77 for rotatably receiving a cam 78, eccentrically mounted on a shank 79, formed integral therewith, and rotatably extended through the ring 73. The shank end 81, opposite the eccentric or cam 78, is threaded for co-action with a washer and nut assembly 82. It will be apparent, therefore, that on loosening of the nut assembly 82, and rotation of the cam 78 relative to the connector member 76, that the connector member 76 is radially adjustable relative to the periphery of the body member 67. The connector member 76 is maintained in an adjusted position, by merely tightening the nut assembly 82. A peripheral shoulder 83 on the cam 78 keeps the connector 76 rotatably supported on the cam while permitting radial extension of the connector 76 to an adjusted position therefor.

Each connector member 76 is formed at one end 84 with a concave notch 86 for receiving in substantial mating engagement an end link 87 of a chain or flexible beater 88. The link 87 is rigidly connected to the connector member 76 at the cavity 86 as by a weld 89. Thus, adjustment of the connector 76 radially of the body member 67, effectively provides for an adjustment in the radially extended length of the chain 88 relative to the body member 67.

As previously mentioned a pair of connector devices 74 are arranged in a diametrically opposed relation on a corresponding ring 73. Additionally, the connecting devices 74 on adjacent rings 73, are in an angularly spaced relation relative to the body member 67 so as to form a pair of spiral rows of chains 88 extended axially of the body member 67. As illustrated in FIG. 2, the spiral rows are of a reversed pitch to opposite sides of the central portion 91 of the body member 67. This reversed pitch of the spiral paths of the beater chains 88 tends to move the material acted upon by the flail assembly 38 in opposite directions axially of the shaft unit 65, namely, in reversed directions from the central portion 91 of the shaft unit 65.

The beater chains 88 in their radially extended positions (FIG. 5) are of a length such that their free or terminal end portions 92 travel in juxtaposition or contiguous with the conveyor means 29 or bottom wall 24 of the box 20. This relation of the chain ends 92 and conveyor means 29 is accomplished by virute of the individual adjustment of each chain 88 relative to the shaft assembly 65 as provided by the connecting devices 74. It will be noted that such relation is maintained from a position of the flail assembly 38, within the open end 28 of the box 20, wherein the shaft 65 is substantially above the rear conveyor shaft 32 (FIG. 5), to a position of the flail assembly 38 located outwardly of the open box end 28, and wherein the shaft 65 is located downwardly and outwardly of the rear conveyor shaft 32 (FIG. 1).

In the use of the apparatus of this invention, assume that a spreader operation is to be performed. For this operation the frame structure 37 is pivotally moved to locate the flail shaft 65 upwardly from the rear conveyor shaft 32, to its position shown in FIG. 5 and in dotted lines in FIG. 1. The flail assembly is rotated in a counterclockwise direction, as indicated by the arrows in FIGS. 1 and 5, so that the chains 88 are moved downwardly into the material moved by the conveyor means 29 in a direction toward the rear or open end 28 of the box 20. In other words, the lower peripheral portion of the flail assembly 38 is moved in a direction outwardly of the box 20.

By virtue of the beating action of the chains 88 the material to be spread from the box 20 is uniformly broken up into a substantially comminuted form, regardless of its original bulk size within the box 20. The material, in such form, is then carried by the rotating or impeller action of the rotating chains 88, for discharge outwardly from the rear end 28 of the box in a path substantially tangential to the lower peripheral portion of the flail assembly 38. As a result of the contiguous relation of the chain ends 92 with the conveyor means 29 it will be appreciated that substantially all of the material carried on, and moved by the conveyor means 29, is acted upon by the chains 88. All of the material to be spread is thus in a substantial comminuted form and the dropping of a ribbon or chunks of material from the box 20 is substantially eliminated.

Figures 3, 4:
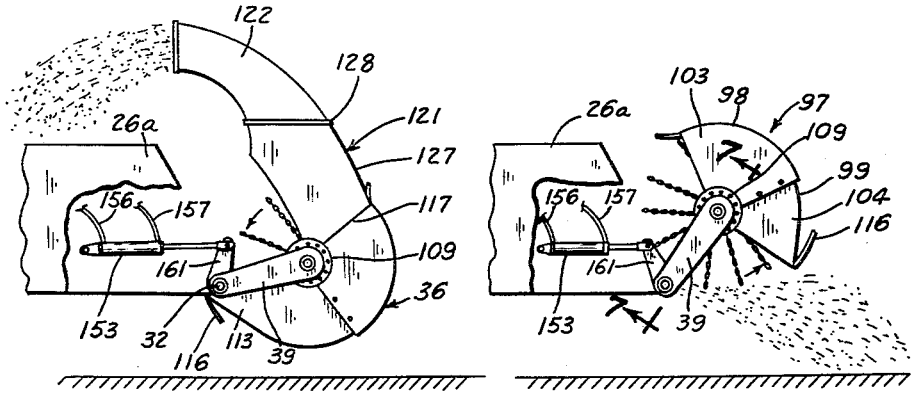
FIG. 3 is a fragmentary side elevational view of the rear end portion of the spreading apparatus in FIG. 1, showing the flail assembly in a cooperative relation with an attachable hood or deflector when the spreader is to be operated as a mixer.
FIG. 4 is a fragmentary side elevational view of the rear end portion of the spreader apparatus showing the flail assembly in a position for spreading material.

A guard or deflector unit indicated generally as 97 in FIGS. 4, 5 and 7, which prevents the throwing of any material or foreign object in the material in a direction toward the operator of the apparatus, is arranged about the flail assembly 38 so as to extend over the peripheral portion thereof located between the upper rear ends of the box side walls 26 and 26a to a point spaced upwardly and rearwardly from the rear conveyor shaft 32. The deflector unit 97 is comprised of a pair of shield segments 98 and 99 each of which includes a peripheral portion 101 and 102, respectively, and side or radial portions 103 and 104, also respectively. The peripheral portions 101 and 102 conform generally to the periphery of the flail assembly 38, and are adapted for relative circumferential expansion and contraction, with the segment 99 being received in a nested relation within the segment 98. The side or radial shield portions 103 and 104 are rotatably supported on the axles 68 of the flail shaft unit 65, whereby the peripheral portions 101 and 102 are relatively movable in a circular path about the axles 68.

Each side member 39 and 41 of the frame structure 37 for the flail assembly 38, is formed with an extension 106, as shown for the side member 39 in FIG. 7, at its terminal end 71 which is provided with an opening (not shown) for receiving a nut and bolt assembly 107 that is selectively received in openings 109 formed in the radial shield portions 103 and 104 in a circular path having a center of rotation coincident with the aixs of the axles 68. By merely removing the nut assemblies 107, from the radial shield portions 103 and 104, the segment members 98 and 99 are relatively movable to a plurality of circumferentially adjusted positions, and with an adjusted position being maintained by insertion of the bolt assemblies 107 through the side plate 39 and selected aligned openings in the radial shield portions 103 and 104.

As previously described, relative to the position of the flail assembly 38 shown in FIG. 5 and in dotted lines in FIG. 1, the material to be spread is discharged by the flail assembly in a path substantially tangential to the lower peripheral portion of the flail assembly 38. Thus, and referring to FIG. 5, this path would be in a direction extended substantially longitudinally of the bottom wall 24 of the box 20. However, it will be appreciated that the direction of discharge of the material to be spread can be varied by varying the location of the flail shaft unit 65 in an upwardly extended direction from the rear conveyor shaft 32. Thus, and as shown in FIG. 4 by way of example, the shaft unit 65 of the flail assembly 38 is located upwardly and rearwardly from the rear conveyor shaft 32. In this position, the flail assembly would discharge the material in a direction downwardly and rearwardly from the box 20.

When the apparatus of this invention is to be used for loading the box 20, the frame 37 for the flail assembly 38 is moved to its position shown in full lines in FIG. 1, wherein the flail shaft unit 65 is located downwardly and rearwardly from the rear conveyor shaft 32. In this position, the chains 88 will continue to move in a contiguous relation with the conveyor means 29 over one peripheral portion of the flail assembly 38, concurrently with the movement of the lower peripheral portion of the flail assembly 38 in engagement with the ground 114 at a depth below the level of the wheels 22. As a result, the chains 88 are in working engagement with a ground surface at a depth below the ground engaging portions of the wheels 22 dependent upon the pivotally adjusted position of the combination spreader and loader unit 36.

At this ground engaging location of the flail assembly 38 the deflector segments 98 and 99 are relatively moved to fully extended positions and connected together at their adjacent sides as by bolt assemblies 112 (FIG. 1) so as to constitute what might be called a unit assembly. The bolt assemblies 107, otherwise used for maintaining the segments 98 and 99 in relatively adjusted positions, are removed during a loading operation. As a result, the deflector unit 97 is freely rotatable about the axles 68 of the flail shaft unit 65 and so that its lower end 113 is in riding engagement with the ground surface 114, a ground shoe 116 being provided at the end 113 for such purpose. It is seen, therefore, that the deflector unit 97 is thus free to move in a generally up and down direction in response to changes in the contour of the ground being traveled, with its end 113 in a position to receive manure or like material, indicated at 120, acted upon by the chains 88 and removed from the ground surface 114. Material thus picked up from the ground is thrown into the deflector unit 97 and moved therein by the chains 88 for discharge from the upper end 117 of the deflector unit and into the box 20, with this discharge of the material taking place in a direction toward the front end of the box 20. To prevent the loading of material only over the rear end portion of the box 20, the movement of the conveyor means 29 is reversed, relative to its movement for a spreading operation. Depending upon the rate of the loading operation the conveyor means 29 is operated either continuously, or intermittently, until the box 20 is fully loaded.

The flail assembly 38 and deflector unit 97 are then moved from their full line positions in FIG. 1, to their dotted line positions in the same figure, for transport and spreading purposes.

The apparatus of this invention is also adapted to efficiently operate as a mixer and grinder for feeds. When used for this operation the segments 98 and 99 of the deflector unit 97 are adjusted to their fully extended positions, and the frame assembly 37 is moved to locate the flail assembly 38 such that its shaft unit 65 is arranged generally rearwardly from the rear conveyor shaft 32, as shown in FIG. 3. The deflector unit 97 is then pivoted relative to the axles 68 until its end 113 is substantially adjacent the rear conveyor shaft 32, and is maintained in this position by the bolt assemblies 107, which are utilized in the same manner as previously described in connection with their use during a spreading operation.

A detachable hood or extension 121 (FIGS. 3 and 6) for the deflector unit 97 is attached, in any suitable manner, to the end 117 of the unit 97 so as to extend generally in a forward and upward direction. The detachable hood 121 has an upper discharge spout 122 which, in a downward direction, is of a progressive increasing diameter and terminates in what might be generally called a three-sided box structure 123 having an open front 124 facing the rear end of the box 20, and the side walls 126 and a rear wall 127 supported on and forming extensions of the peripheral portion 101 and radial side portions 103 of the segment shield member 98 of the deflector unit 97.

On rotation of the flail assembly 38, in a counterclockwise direction as viewed in FIG. 3, and on operation of the conveyor means 29 to move material to be mixed rearwardly of the box 20, such material is discharged by the conveyor means into the deflector unit 97, where it is acted upon and then discharged through the hood extension 121 back into the box 20 and onto the conveyor means 29. This cycle of operation may be repeated as required, to get a desired material mix. It will be appreciated that this same operation can be used in the grinding of corn or like grain into a comminuted form, and with the degree of comminution being dependent only on the length of time the operation is continued. When thus utilized it is seen that the apparatus functions in the same manner as a hammer mill.

On completion of a mixing or mill operation, the material can be loaded into a bin or a grain wagon (not shown) by rotation of the discharge spout 122 of the hood attachment 121 to direct the material away from the box 20. For this purpose the discharge spout 122 is rotatably supported on the box structure 123 by any suitable means indicated generally at 128.

Figure 10:
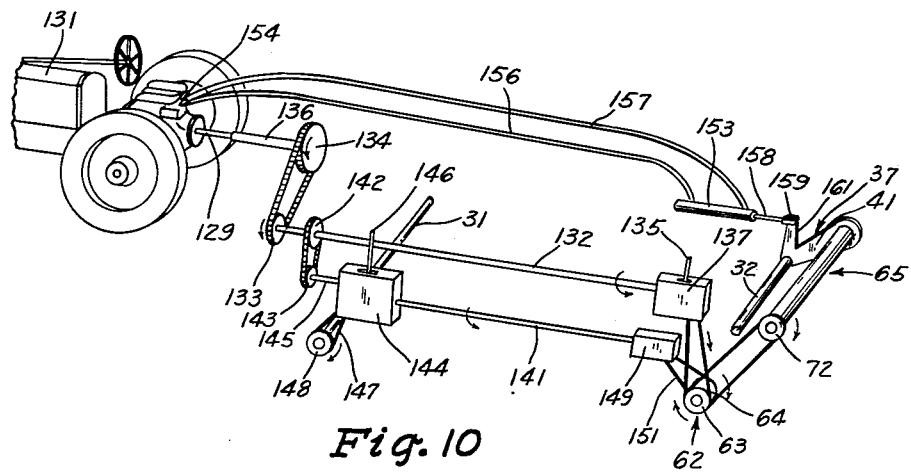
FIG. 10 is a diagrammatic showing of the power transmission system for the spreader apparatus in FIGS. 1 and 2.

As shown in FIG. 10 power for operating the conveyor means 29 and flail assembly 38 is supplied entirely from the power takeoff 129 of a usual farm tractor 131. With reference to FIGS. 1 and 10, power is supplied to the flail assembly 38 by means including a shaft 132 rotatably supported on and extended longitudinally of the box side wall 26a. The shaft 132 has mounted on its front end a gear 133 which is in chain connection with a gear 134 mounted on the front wall 27 of the box 20, with the gear 134 being in direct driven engagement with the power take-off 129 through a usual telescoping shaft 136. A gear and clutch mechanism, indicated generally as 137, and in operative association with the rear end of the shaft 132, is in chain connection with the sprocket 63 of the sprocket unit 62. In turn, the sprocket 64 of the sprocket unit 62 is chain connected with the sprocket 72 that is mounted on one of the axles 68 of the flail shaft unit 65. It is seen, therefore, that the flail assembly 38 is always rotated in the same direction, and is adapted to be rendered inoperative on suitable manipulation of the handle 135 for the clutch mechanism 137.

The power system for the conveyor shafts 31 and 32 includes a shaft 141, carried on the side wall 26a of the box 20 in a parallel relation with the shaft 132, and having its forward end operatively associated with a reversing and clutch unit 144, which includes a forwardly extended counter shaft 145. A gear 142, mounted on the shaft 132, is chain connected with a gear 143 carried on the counter shaft 145. The reversing and clutch unit 144 is equipped with an actuating handle 146 and is in a chain connection 147 with a sprocket 148 mounted on the front conveyor shaft 31. The shaft 141 from the reversing unit 144 is operatively associated with a gear unit 149 which is in driven relation through a chain connection 151 with the sprocket 61 on the rear conveyor shaft 32 (FIG. 7).

The handle 146 is actuated in one direction, from a neutral position, to provide for the transmission of power to the rear conveyor shaft 32. To move material toward the front end of the box 20, the handle 146 is actuated in an opposite direction, from a neutral position, to provide for the transmission of power to the front conveyor shaft 31.

Operation of the frame structure 37, to pivotally move the flail assembly 38 relative to the rear conveyor shaft 32, is accomplished by means including a double acting hydraulic cylinder assembly 153 (FIGS. 2, 3 and 10) carried on the side wall 26 of the box 20, and operated in a usual manner from a pump unit 154, provided on the tractor 131, and connected with the cylinder assembly 153 by fluid connections 156 and 157. The piston 158, of the cylinder assembly 153, is pivotally connected at 159 with an arm extension 161 integrally formed with the side plate or arm 41 of the frame structure 37.

Thus far in the description the combination loader and spreader unit 36, has been described relative to its location at the rear open end of a spreader box. In FIGS. 11–16, inclusive, the unit 36 is illustrated as applied to the front open end 170 of a box 171. Since the structure of the apparatus in FIGS. 11–16, inclusive, is similar in most respects to the structure of the apparatus described in connection with FIGS. 1–10, inclusive, like numerals will be used to designate like parts.

Figure 15:
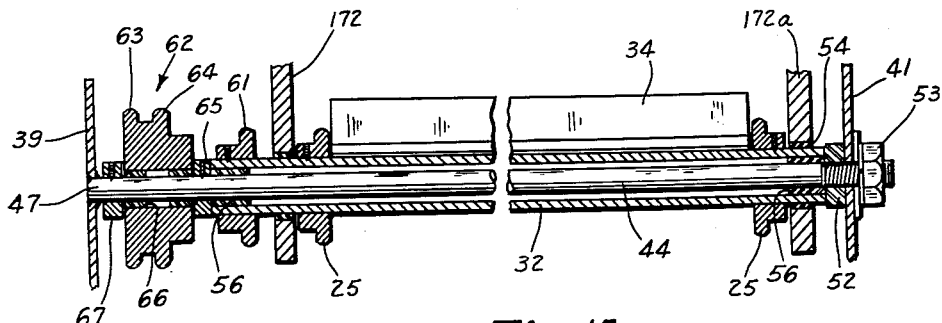
FIG. 15 is an enlarged foreshortened sectional detail view as seen on the line 15—15 in FIG. 12.

The box 171 (FIGS. 11 and 12) has side walls 172 and 172a, a rear wall 173 and a bottom wall 175. The conveyor unit 29 is associated with the box 171 in all respects similar to its assembly with the box 20, previously described, except that the conveyor shaft 32 is located at the open forward end 170 of the box 171. Also, as shown in FIGS. 14 and 15, the front shaft 32 and frame structure 37 are of the same construction, and similar in relative assembly and operation to the rear conveyor shaft 32 and frame structure 37 described in connection with FIGS. 7 and 9. Likewise, the flail or beater assembly 38 and deflector unit 97, in FIGS. 13 and 14, are similar in construction and operation to the flail assembly 38 and deflector unit 97 of FIGS. 5 and 7.

Figure 11:
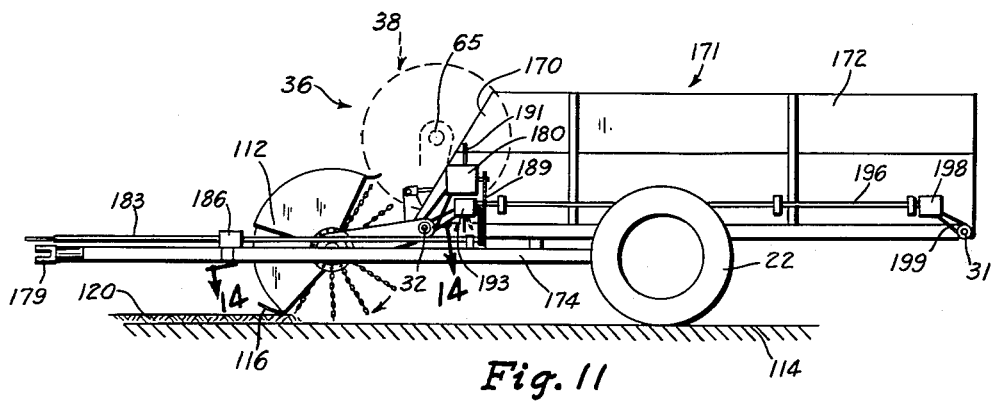
FIG. 11 is a side elevational view of a modified form of the spreader apparatus showing a front end mounted flail assembly.

With reference to FIG. 11 it is seen that the box 171 includes a frame 174 suitably carried on ground wheels 22. The frame 174 has a pair of transversely opposite longitudinal extensions 177 and 177a which project forwardly of the box 171 and are connected across their front ends by a cross member 176. As clearly appears in FIG. 12 the flail assembly 38 and its supporting frame 37 are movable between the extensions 177 and 177a in a clearance relation with the cross member 176 to provide for pivotal movement of the flail assembly 38 to a ground engaging position for loading the box 171. A tongue structure 178, connected to and projected forwardly of the cross member 176, has a hitch 179 adapted for towing connection with a usual farm tractor.

Figure 13:
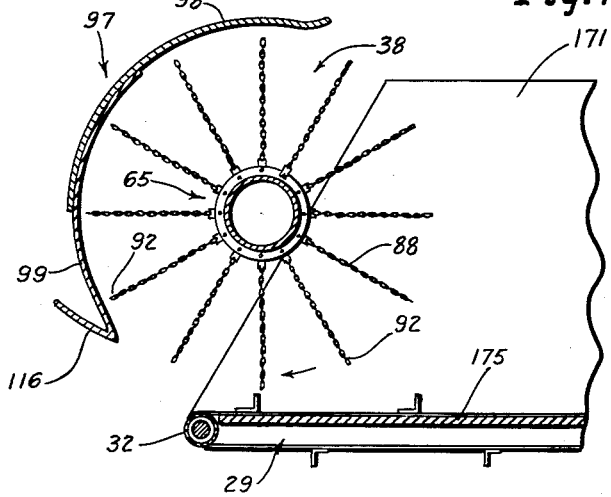
FIG. 13 is an enlarged sectional detail view showing the assembly relation of the flail unit and conveyor means of the apparatus of FIG. 11.
Figures 14, 16:
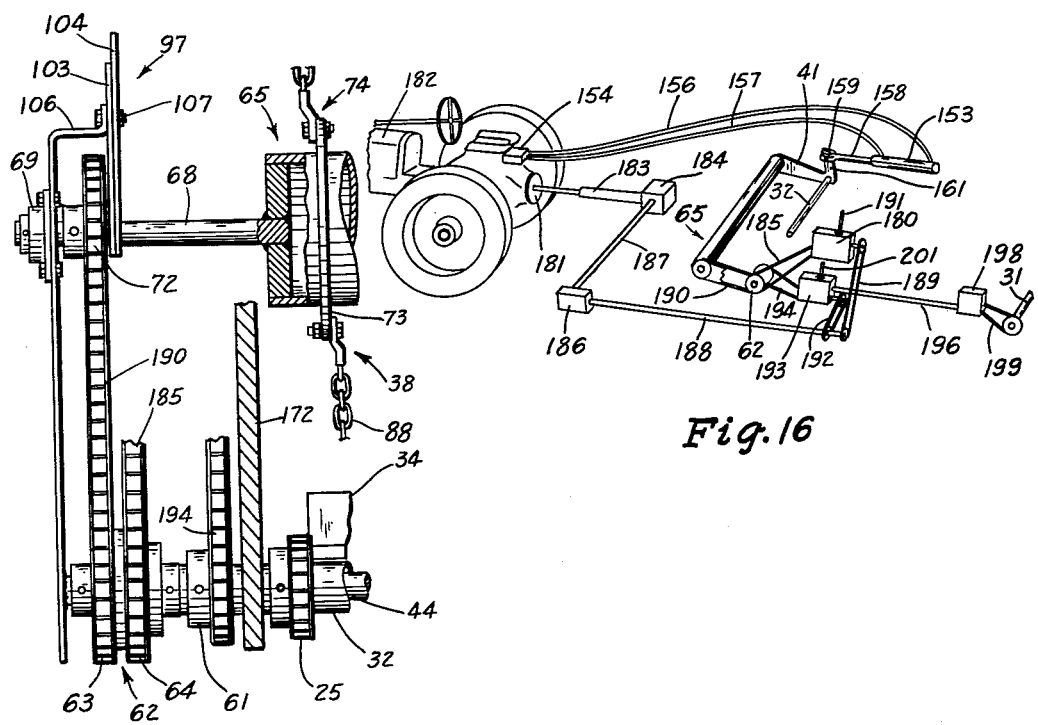
FIG. 14 is an enlarged fragmentary sectional detail view taken substantially along the line 14—14 in FIG. 11.
FIG. 16 is a diagrammatic showing of the power transmission system for the spreader apparatus shown in FIGS. 11 and 12.

When the apparatus of FIG. 11 to is to be used for spreading material from the box 171, the frame structure 37 is pivotally moved so that the side members or arms 39 and 41 are substantially upright, whereby the shaft unit 65 of the flail assembly 38 is located above the front conveyor shaft 32 as shown in FIG. 13 and in dotted lines in FIG. 11. With reference to FIG. 13 it is seen that the terminal ends 92 of the chains 88 are in a contiguous or adjacent relation with the conveyor unit 29 or bottom wall 175 of the box 171. This contiguous relation is maintained for all pivotally moved positions of the frame structure 37 about the shaft 32, as was previously described in connection with FIGS. 1 and 5.

On rotation of the flail assembly 38 in a clockwise direction, as indicated by an arrow in FIG. 11, and operation of the conveyor unit 29 to move the material to be spread in a direction toward the open front end 170 of the box 171, the chains 88 are moved downwardly into the material. The material thus acted upon by the chains 88, is uniformly broken up and discharged forwardly from the box 171 in a path substantially tangential to the lower portion of the flail assembly 38, the movement of which lower portion is in a direction away from the box. In this spreading operation the deflector unit 97 is adjusted so as to substantially enclose the forward side of the flail assembly 38 (FIG. 13), whereby to positively prevent the accidental discharge of material, or foreign objects in the material, toward the tractor operator.

When the box 171 is to be loaded the flail assembly 38 is moved outwardly from the open box end 170 so that the frame structure 37 extends downwardly and forwardly from the front conveyor shaft 32, as shown in full lines in FIG. 11. At this position of the flail assembly 38, the segment members 98 and 99 of the deflector unit 97 are held together by the connecting bolts 112, and released by the bolts 107 from the frame structure 37, so that the deflector unit is freely rotatable about the axles 68 of the flail shaft unit 65. With the runner 116 riding on the material 120, to be loaded, the deflector unit 97 is freely movable to follow changes in the contour of the material 120.

To load the material, indicated as 120 in FIG. 11, and lying on the ground surface 114, the apparatus is moved forwardly, whereby the terminal ends 92 of the chains 88 act upon and move the material 120 through the deflector unit 97 and into the box 171. It will be understood, of course, that the movement of the frame structure 37 to an adjusted position will determine the depth at which the chains 88 will act on the material 120. During this loading operation of the flail assembly 38, the conveyor unit 29 may be operated to move the loaded material toward the rear end of the box 171, until the box is completely filled. On completion of the loading operation, the flail assembly 38 and deflector unit 97, are relatively moved to their positions for a spreading operation, as shown in FIG. 13.

It is to be understood also that a hood attachment 121, can be used with the apparatus of FIG. 11, for mixing and mill operations, in all ways similar to its use described relative to FIG. 3.

Figure 12:
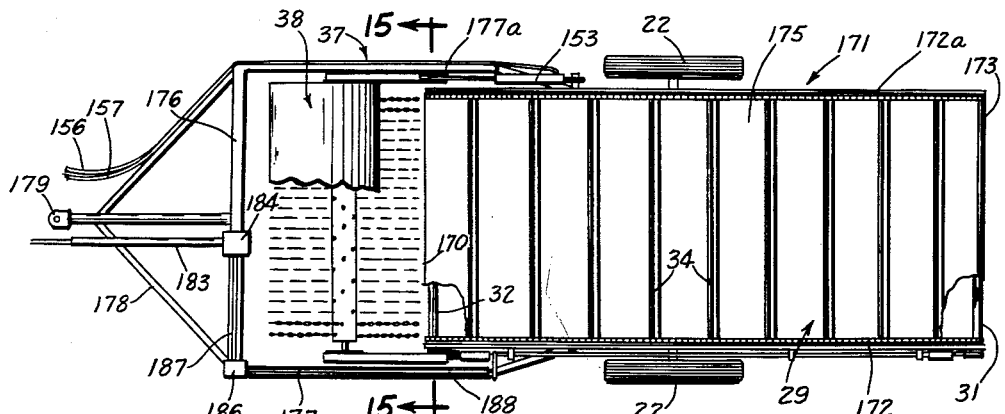
FIG. 12 is a plan view of the spreader apparatus shown in FIG. 11, with parts broken away to more clearly show its construction.

As shown in FIGS. 11 and 12, and diagramatically in FIG. 16, the power takeoff 181 of a farm tractor 182 is connected through a telescopic shaft 183 with a gear assembly 184 mounted on the cross member 176. A second gear assembly 184 through a shaft 187 and has a second member 176 with the extension 177, is connected with the gear asembly 184 through a shaft 187 and has a second shaft 188 extended longitudinally of and supported on the frame extension 177. A gear and clutch unit 180 mounted on the box side wall 172 is in chain connection, as indicated at 189, with the shaft 188, and in chain connection 185 with the sprocket unit 62 which in turn is connected through a chain 190 with the shaft unit 65 of the flail assembly 38. An actuating handle 191 for the clutch unit 180 is operable to render the flail assembly inoperative.

The shaft 188 is also in chain connection at 192 with a reversing and clutch mechanism 193 mounted on the box side wall 172 and having a chain connection 194 with the front conveyor shaft 32. A shaft 196, mounted on and extended longitudinally of the box side wall 172, has its forward end connected with the mechanism 193, and its rear end operatively associated with a gear assembly 198 having a chain connection 199 with the rear conveyor shaft 31, which is similar in all respects to the front conveyor shaft 31 of the apparatus shown in FIGS. 1 and 2. An operating handle, 201, on the reversing and clutch mechanism 193, is manipulated in one direction to provide for the conveyor shaft 32 operating the conveyor unit 29 to move material in a direction toward the front end 170 of the box 171, and is manipulated in an opposite direction to provide for the rear conveyor shaft 31 operating the conveyor 29 to move material toward the rear end 173 of the box 171. In a neutral position of the lever 201 the conveyor unit 29 is rendered inoperative.

Similarly to the adjustment of the frame structure 37 of the apparatus in FIG. 1, the apparatus of FIG. 11, includes a double-acting hydraulic cylinder assembly 153 mounted on the side wall 172a of the box 171, and having fluid connection through conduits 156 and 157 with an oil pump unit 154 provided on the tractor 182. The piston 158 of the cylinder assembly 153 is pivotally connected at 159 with an arm extension 161 on the side member 41 of the frame structure 37.

From the above description it is seen that the spreader apparatus of this invention, by manipulation of the combination loader and spreader unit 36 and its associated deflector unit 97, is readily adapted to provide for an efficient spreading or loading operation, without requiring any disconnection of the farm tractor from the apparatus. During a spreading operation it will be appreciated that the chains or flexible beaters 88 of the flail assembly 38 are capable of striking foreign objects in the material to be spread, without fear of being damaged, and yet providing for the discharge of such foreign objects from the spreader box. By virtue of the flexibility of the chains 88, they are automatically self-cleaning and the smooth surface of their tubular support 67 substantially eliminates any wrapping or accumulation of material between the chain connections 74 and about the surface of the tubular support 67. As a result the flail assembly 38 is continuously maintained in rotational balance. It will be appreciated further that the chains, when acting on manure, will efficiently uniformly break up the manure, regardless of temperature conditions, so as to eliminate any spreading of clods.

Importantly also, is the fact that as a result of the striking or impact action of the chains 88 on the material to be spread, as contrasted to the pickup action of the usual rotational finger assemblies now in general use on farm spreaders, substantially less power from the tractor is required in a spreading operation. Also, although the apparatus of this invention has been described primarily for fertilizer spreading purposes, it will readily be seen that it can be used to load and spread dirt for landscape or fill-in purposes. Of further importance to the farmer, is a ready adaptation of the apparatus, to efficiently mix material, or mill grain, by the use of the hood attachment 121 with the combination unit 36. Additionally, the combination unit 36 in no way interferes with the use of the apparatus as a transport vehicle in the handling of either bulk, sacked or object materials, since the chains 88, when the flail assembly is idle, are merely deflected by material being unloaded by the converyor unit 29.

Although the invention has been described with respect to a preferred embodiment thereof, it is to be understood that it is not to be so limited since changes can be made therein which are within the full intended scope of the invention as defined by the appended claims.

We claim:

1. In a spreader apparatus having a box and a material moving conveyor means movable longitudinally of said box, a combination spreading and loading unit including a frame having one end pivotally supported on said box, a transversely extended flail assembly rotatably supported at the other end of said frame and including radial extendible flail members, means for pivotally moving said frame to a first upwardly extended position wherein said flail assembly is within said box, and to a second position extended downwardly and outwardly wherein said flail assembly is out of said box, means for rotating said flail assembly in a direction to move the flail members downwardly into the material moved by said conveyor means, with the free ends of said flail members being movable adjacent to said conveyor means in said first and second positions of said frame, and a cover means mounted on said frame for adjustable movement in a path adjacent to and concentric with a perpiheral portion of said flail assembly, with the flail assembly in said first position of the frame acting to discharge material from said box and in said second position acting to load material into said box.

2. In a spreader apparatus having a wheel supported box open at one end and provided with a bottom wall, a conveyor means for moving material longitudinally of said box toward said open end, a combination spreader and loader unit including a frame having one end pivotally supported adjacent the open end of said box, a flail assembly extended transversely of said box and rotatably mounted at the other end of said frame, means for pivotally moving said frame to move said flail assembly to a spreading position within the open end of said box and to a loading position outside of said box, said flail assembly in each of said two positions having a peripheral portion thereof movable in a contiguous relation with said bottom wall, and in said loading position having a second peripheral portion movable in a path below the level of the wheels for said box, means for rotating said flail assembly in a direction such that the lower peripheral portion thereof moves in a direction away from said box, and a cover means partially enclosing said flail assembly and supported on said frame for adjustable movement about said flail assembly.

3. In a spreader apparatus including a box and a material conveyor means movable longitudinally of said box and having a rotatable shaft at each end of said box, a combination spreader and loader unit including a frame having one end pivotally mounted on said box for pivotal movement of the other end thereof about one of said shafts, a beater assembly extended transversely of said box and rotatably carried at the other end of said frame, means for pivotally moving said frame to provide for the movement of said beater assembly to a spreading position within said box, wherein said frame extends upwardly from said one shaft, and to a position outside of said box for loading material from a ground surface into said box wherein said frame extends downwardly and outwardly from said one shaft, means for rotating said beater assembly in a direction such that the lower peripheral portion of said beater assembly moves away from said box, with a portion of the outer periphery of said beater assembly being adjacent the conveyor means at said one shaft in said spreading and loading positions for said beater assembly, and a partial cover means for said beater assembly adjustably supported on said frame in a cooperative relation with said beater assembly.

4. A spreader apparatus including a box and material conveying means movable longitudinally of said box and having the ends thereof adjacent the opposite ends of said box, a combination spreader and loader unit including a rotatable beater assembly having a shaft and beaters pivotally secured to said shaft for radial extension therefrom, means supporting said beater assembly for pivotal movement about one end of said conveying means to a spreading position within said box wherein said shaft is located above said one end of the conveying means, and to a loading position outside of said box wherein said shaft is located downwardly and outwardly from said one end of the conveying means, with said beaters in radially extended positions having the free ends thereof movable contiguous to said one end of the conveying means, said free ends in the loading position of said beater assembly being in working engagement with material to be loaded, and cover means partially extended about the peripheral portion of said beater assembly and supported for adjustable pivotal movement about said shaft, said beater assembly, in the spreading position therefor, acting on material moved thereto by said conveying means to spread the material outwardly from said box, and in the loading position coacting with said cover means to move material to be loaded into said box.

5. In a spreader apparatus having a box and conveyor means for moving material longitudinally of said box, a combination spreader and loader unit including a frame, means rotatably carrying one end of said frame at one end of said box for swingable movement of the other end of said frame, a rotary flail assembly rotatably mounted at the other end of said frame with a peripheral portion thereof in juxtaposition with said conveyor means, means for pivotally moving said frame to move said flail assembly to a material spreading position located upwardly from said conveyor means and within said one end of the box, and to a material loading position outside of said box located outwardly from said conveyor means, a partial cover means for said flail assembly mounted on said frame for adjustable movement in a path adjacent to and concentric with said flail assembly, and means for rotating said flail assembly in a direction to move downwardly into the material moved by said conveyor means.

References Cited in the file of this patent

UNITED STATES PATENTS

| 968,788 | Olander | Aug. 30, 1910 |
| 1,125,122 | Koenig | Jan. 19, 1915 |
| 1,346,433 | Varland | July 13, 1920 |
| 1,435,766 | Varland | Nov. 14, 1922 |
| 2,952,465 | Skromme | Sept. 13, 1960 |

FOREIGN PATENTS

| 299,827 | Germany | Aug. 11, 1917 |
| 833,723 | Germany | Mar. 10, 1952 |